US010407111B2

(12) United States Patent
Frederick et al.

(10) Patent No.: US 10,407,111 B2
(45) Date of Patent: Sep. 10, 2019

(54) CUSTOMIZABLE CARGO BED SYSTEM FOR A VEHICLE

(71) Applicant: Toyota Motor Engineering & Manufacturing North America, Inc., Erlanger, KY (US)

(72) Inventors: Scott L. Frederick, Brighton, MI (US); Ryan C. Harris, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 113 days.

(21) Appl. No.: 15/433,685

(22) Filed: Feb. 15, 2017

(65) Prior Publication Data

US 2018/0215323 A1 Aug. 2, 2018

Related U.S. Application Data

(60) Provisional application No. 62/451,183, filed on Jan. 27, 2017.

(51) Int. Cl.
| | |
|---|---|
| *B60R 9/10* | (2006.01) |
| *B62D 33/02* | (2006.01) |
| *B60R 11/00* | (2006.01) |
| *B60P 1/64* | (2006.01) |
| *B60P 7/08* | (2006.01) |
| *B62D 33/027* | (2006.01) |

(52) U.S. Cl.
CPC ............ *B62D 33/0207* (2013.01); *B60P 1/64* (2013.01); *B60P 7/08* (2013.01); *B60R 9/10* (2013.01); *B60R 11/00* (2013.01); *B62D 33/02* (2013.01); *B62D 33/0273* (2013.01)

(58) Field of Classification Search
CPC ..... B62D 33/02; B62D 33/0207; B60R 11/00; B60R 9/10; B60R 9/06; B60R 13/01
USPC .............................................. 296/183.1, 39.2
See application file for complete search history.

(56) References Cited

U.S. PATENT DOCUMENTS

| | | | | |
|---|---|---|---|---|
| 5,240,301 | A | | 8/1993 | Arnold |
| 5,597,193 | A | * | 1/1997 | Conner ................. B60P 7/0892 224/404 |
| 5,722,711 | A | * | 3/1998 | German .................. B60R 13/01 296/39.2 |
| 5,992,915 | A | * | 11/1999 | Thompson .............. B60R 13/01 296/39.2 |
| 6,015,178 | A | * | 1/2000 | Haack ..................... B60R 13/01 296/39.2 |
| 6,176,657 | B1 | * | 1/2001 | Romph ................. B60P 7/0892 410/121 |
| 6,695,380 | B1 | * | 2/2004 | Hicks ....................... B60R 5/04 296/37.14 |

(Continued)

*Primary Examiner* — Jason S Morrow
(74) *Attorney, Agent, or Firm* — Christopher G. Darrow; Darrow Mustafa PC (57) ABSTRACT

A customizable cargo bed system for a vehicle includes a plurality of adjoining surfaces, with at least one surface of the plurality of adjoining surfaces including at least one recessed portion. The system also includes at least one accessory panel structured to be removably attachable to the at least one surface along the at least one recessed portion. The at least one accessory panel is structured to support at least a portion of an object to be positioned in the cargo bed when the at least one accessory panel is attached to the at least one surface.

16 Claims, 7 Drawing Sheets

(56) References Cited

U.S. PATENT DOCUMENTS

| | | | | |
|---|---|---|---|---|
| 6,827,385 B2* | 12/2004 | Mobley | ............... | B60R 9/00 |
| | | | | 296/37.6 |
| 6,976,720 B1 | 12/2005 | Bequette | | |
| 7,290,820 B1* | 11/2007 | Smith | ............... | B60R 11/00 |
| | | | | 296/37.6 |
| 9,126,466 B1* | 9/2015 | Stockebrand | ......... | B60D 1/015 |
| 2005/0057073 A1* | 3/2005 | Hunt | ............... | B60J 5/0497 |
| | | | | 296/183.1 |
| 2008/0047994 A1* | 2/2008 | Beamer | ............... | B60R 9/00 |
| | | | | 224/403 |
| 2008/0169674 A1 | 7/2008 | Giles | | |
| 2015/0061319 A1* | 3/2015 | Johnson | ............ | B62D 33/023 |
| | | | | 296/183.1 |
| 2016/0129949 A1* | 5/2016 | Marable | ............ | B60J 7/041 |
| | | | | 296/37.6 |

\* cited by examiner

CUSTOMIZABLE CARGO BED SYSTEM FOR A VEHICLE

CROSS REFERENCE TO RELATED APPLICATIONS

This application claims benefit of U.S. Provisional Application No. 62/451,183 filed on Jan. 27, 2017, which is herein incorporated by reference in its entirety.

TECHNICAL FIELD

The present invention relates to vehicles capable of transporting cargo and, more particularly, to a cargo bed configured to be customized to transport various types of cargo according to the need of a user.

BACKGROUND

Certain cargo bed structures may permit a user to attach accessories along rails that run along top edges of the cargo bed sidewalls. However, such rails are very limited with regard to the types of accessories that may be mounted to the rail. Such rails also limit the locations at which cargo items may be supported and secured within the cargo bed.

SUMMARY

In one aspect of the embodiments described herein, a cargo bed for a vehicle is provided. The cargo bed includes a plurality of adjoining surfaces, at least one surface of the plurality of adjoining surfaces having at least one recessed portion formed therealong, the at least one recessed portion being structured to enable mounting of at least one detachable accessory panel therein.

In another aspect of the embodiments described herein, a detachable accessory panel for a vehicle cargo bed is provided. The accessory panel includes an attachment portion structured to be attachable to any one of multiple surfaces of the cargo bed. Portions of the accessory panel define a cargo receiving portion structured for receiving at least a portion of an object therein. The cargo receiving portion is structured to support the at least a portion of the object in the cargo bed when the accessory panel is attached to one of the surfaces of the cargo bed and the at least a portion of the object is positioned within the cargo receiving portion.

In another aspect of the embodiments described herein, a customizable cargo bed system for a vehicle is provided. The cargo bed system includes a plurality of adjoining surfaces, at least one surface of the plurality of adjoining surfaces including at least one recessed portion. The system also includes at least one accessory panel structured to be removably attachable to the at least one surface along the at least one recessed portion. The at least one accessory panel is structured to support at least a portion of an object to be positioned in the cargo bed when the at least one accessory panel is attached to the at least one surface.

DETAILED DESCRIPTION

Embodiments described herein relate to a customizable cargo bed system for a vehicle. The system includes a cargo bed including a plurality of adjoining surfaces. One or more of the adjoining surfaces has at least one recessed portion formed therealong. One or more accessory panels may be detachably mounted in any of the recessed portions. Each accessory panel is structured to support at least a portion of an object to be positioned in the cargo bed when the accessory panel is attached to one of the cargo bed surfaces. An accessory panel may be attachable to any one of multiple surfaces, and may be structured to fulfill the object support function no matter which surface the accessory panel is attached to. For example, an accessory panel may be attachable to a front wall of the cargo bed or to a floor of the cargo bed, and the panel may act to support a portion of a bicycle whether the panel is attached to the front wall or the floor.

Figure 1:
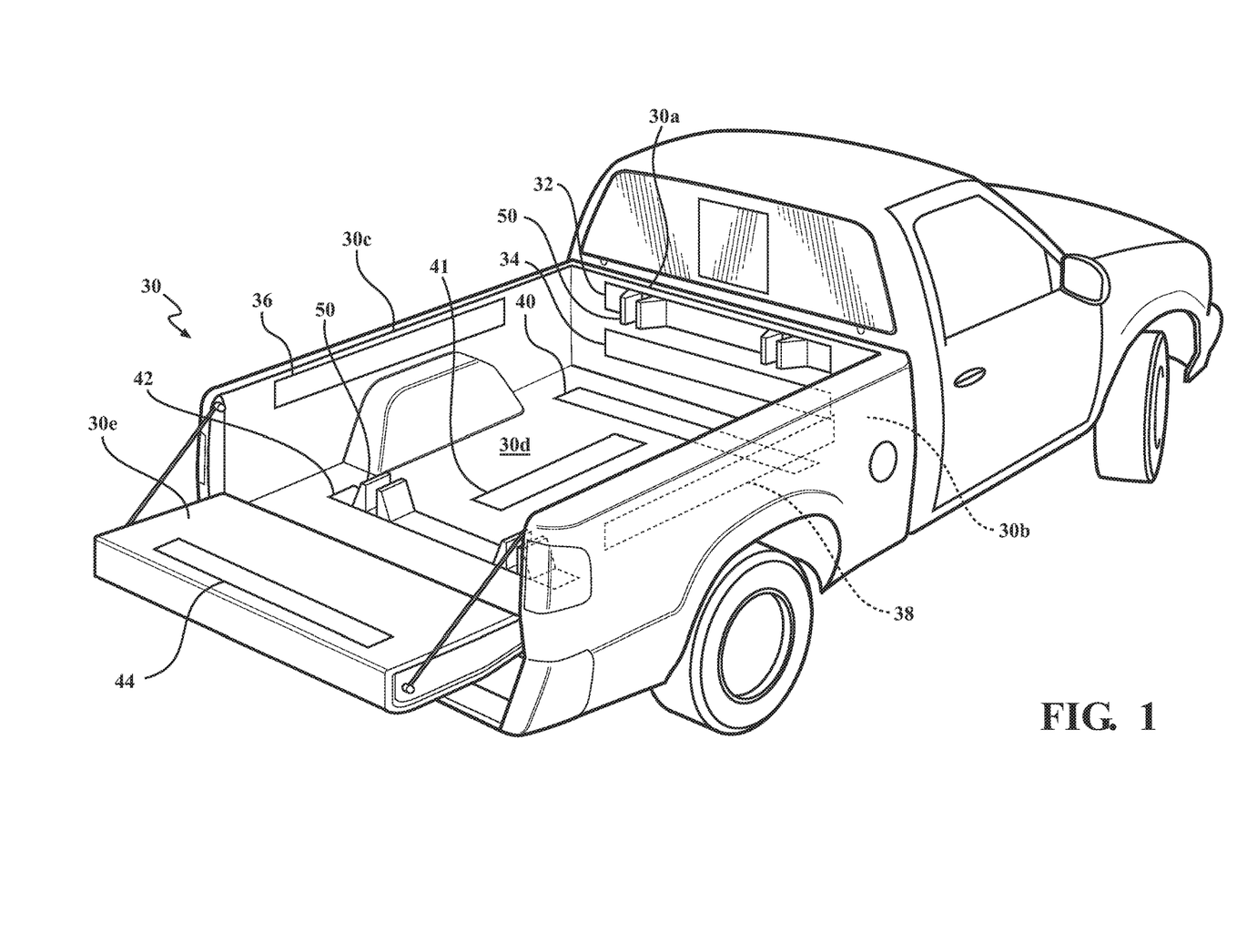
FIG. 1 is a schematic perspective view of a customizable vehicle cargo bed system in accordance with an embodiment described herein.

FIG. 1 is a schematic perspective view of an embodiment of a customizable vehicle cargo bed 30. Cargo bed 30 may be a cargo bed of a pickup truck or another vehicle. Referring to FIG. 1, cargo bed 30 may be formed from a plurality of adjoining surfaces 30a-30e defining the cargo bed. For example, the cargo bed may be formed from a surface 30a defining a front wall of the cargo bed, surface 30b defining a right sidewall, surface 30c defining a left sidewall, surface 30d defining a floor, and surface 30e defining a tailgate wall or interior surface. The cargo bed may be defined by a plurality of surfaces as described above and combined to form, for example, a metal bed of a pickup truck, a polymeric bed liner which may cover an existing bed structure of a pickup truck to serve as a cargo bed, or another structure which may be attachable to the truck for purposes of transporting cargo.

An object may be considered to be positioned in the cargo bed 30 if at least a portion of the object resides within a volume defined by the adjoining surfaces 30a-30e (i.e., the front wall, side walls, floor, and rear tailgate wall). Also, the use of detachable accessory panels as described herein may enable spaces between the cargo bed surfaces 30*a*-30*e* and the remainder of the vehicle to be used for storage of items or portions of items.

Figure 2:
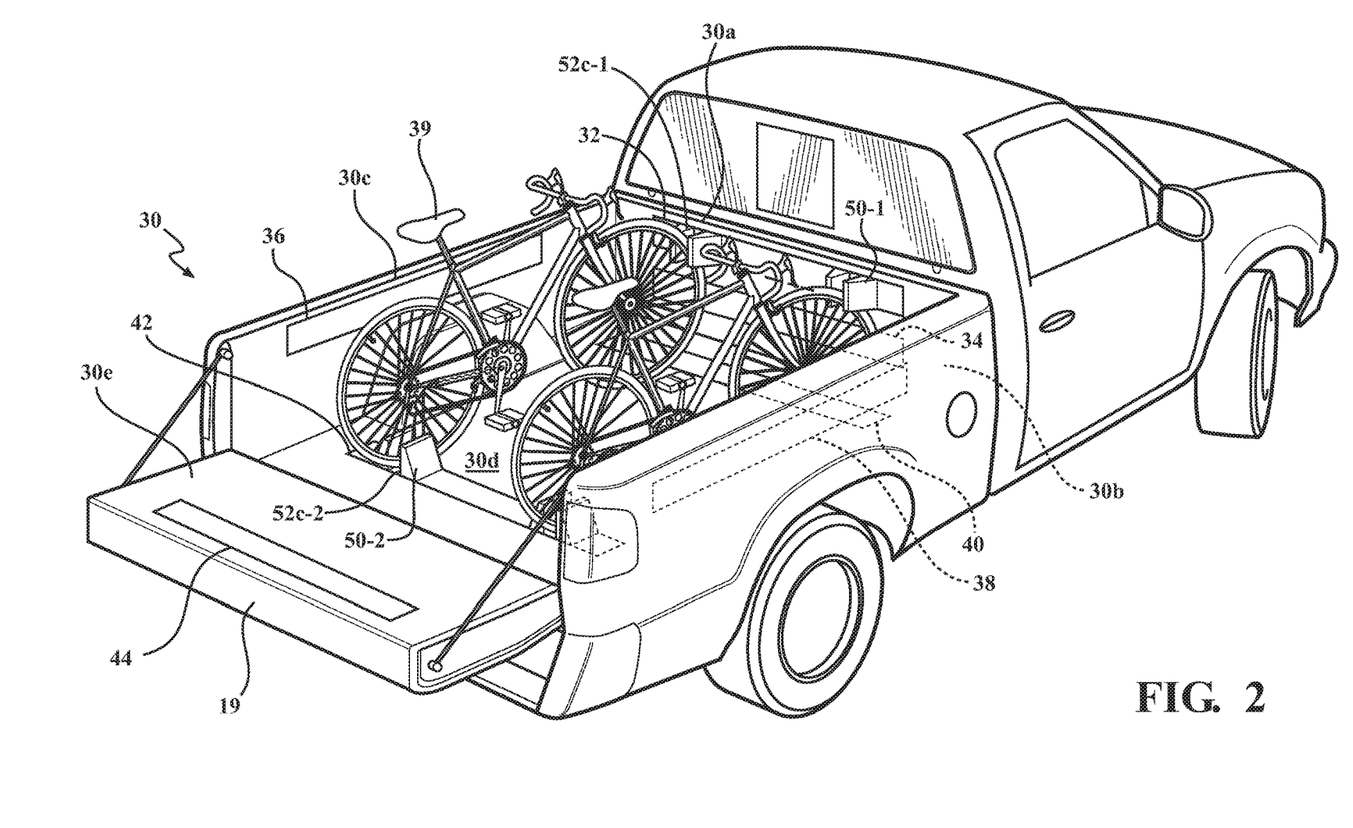
FIG. 2 is the schematic perspective view of FIG. 1 showing accessory panels mounted in the cargo bed supporting a pair of bicycles positioned in the cargo bed.
Figure 4:
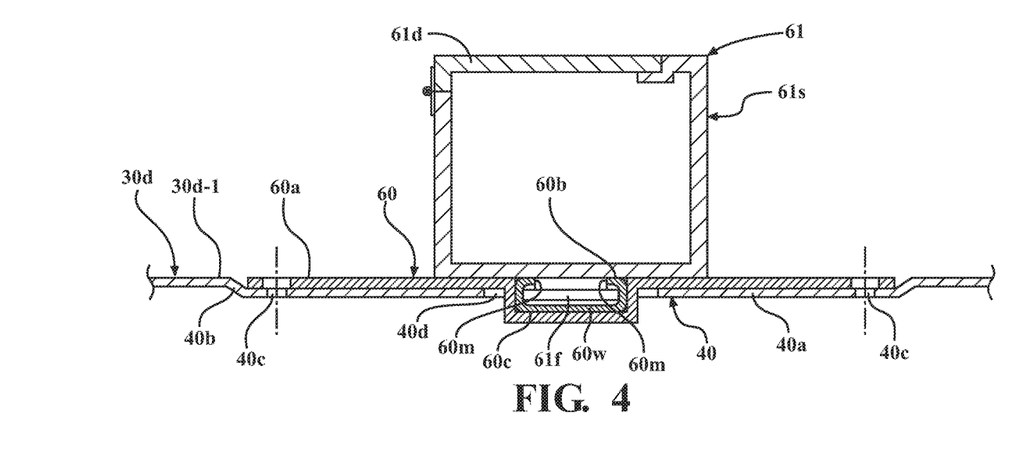
FIG. 4 shows another embodiment of a panel which may be attached to a recessed portion of the cargo bed.

A cargo-receiving portion of a panel mounted in a recessed portion may support an object or a portion of an object when a portion of the object is received in the cargo-receiving portion. For example, as seen in FIG. 2, panels 50-1 and 50-2 support bicycle tires in their respective cargo-receiving portions. Also, as seen in FIG. 4, panel 60 supports storage container 61 in the cargo-receiving portion formed by channel 60*b*.

At least one of the surfaces 30*a*-30*e* may have at least one recessed portion formed therealong. Any of the surfaces 30*a*-30*e* of cargo bed 30 incorporating a recessed portion may have a base portion defining the main or greater portion of the surface, with the recessed portion including a recessed surface spaced apart from the base portion. The recessed portion of the surface may be a portion of the surface extending along a plane different and spaced apart from a plane along which the base portion extends. The recessed portion of the surface may be a portion of the surface structured to enable mounting of a detachable accessory panel therein, as described below. A recessed surface of a recessed portion may be connected to the base portion by one or more connecting portions. Thus, the recessed portion of the cargo bed surface may be formed by the connecting portions and the recessed surface. In one or more arrangements, the recessed surface of a recessed portion includes one or more through-holes and/or other attachment features formed therein. The attachment features may enable attachment of an accessory panel to the recessed portion, as described herein.

Figure 2A:
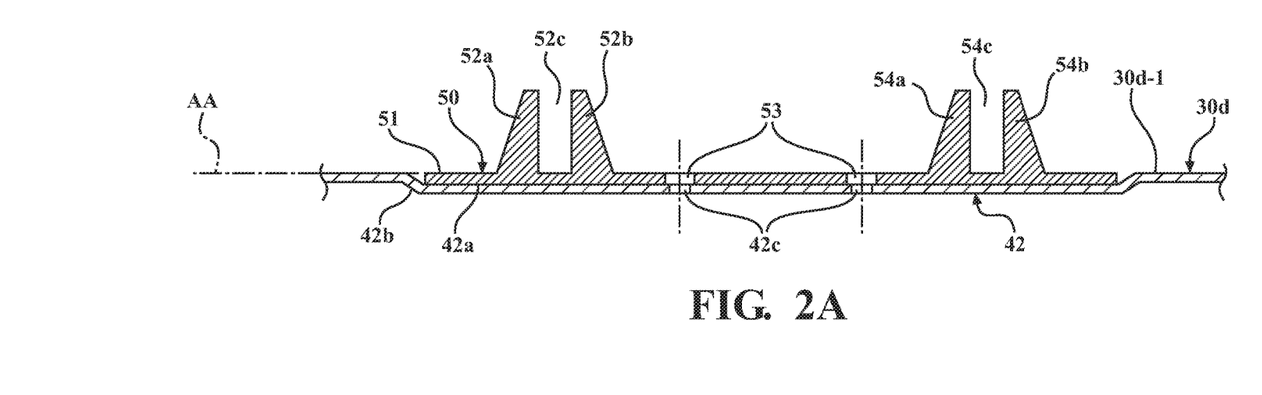
FIG. 2A is a schematic partial cross-sectional side view of an exemplary recessed portion formed in a surface of the cargo bed.
Figure 2B:
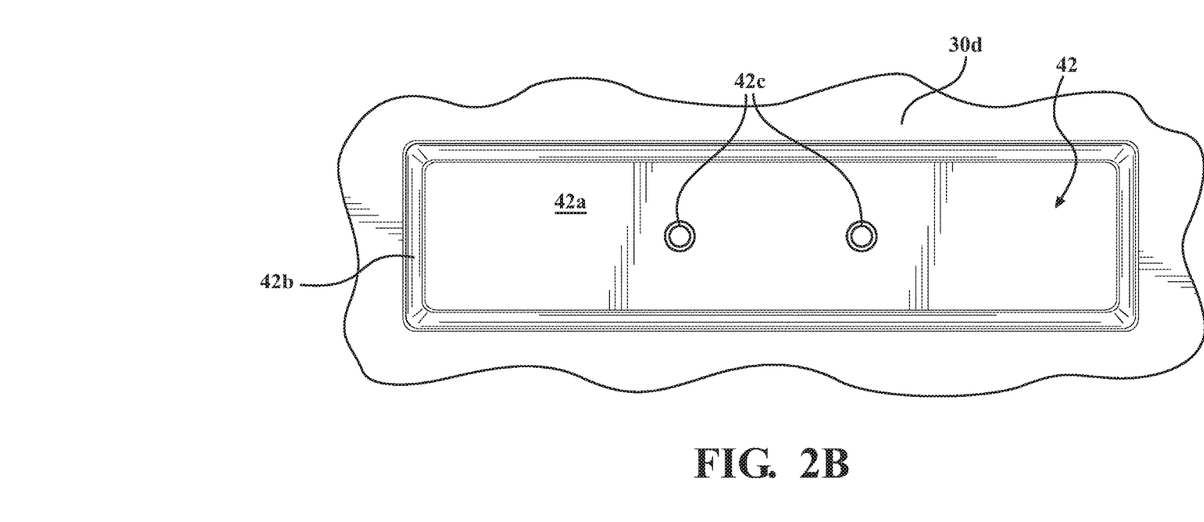
FIG. 2B is a schematic plan view of the recessed portion shown in FIG. 2A.

For example, FIG. 2A shows a partial cross-sectional side view of an exemplary recessed portion (such as recessed portion 42) in the surface forming floor 30*d* of the cargo bed. FIG. 2A shows the recessed portion 42 with an embodiment 50 of an accessory panel panel mounted therein. FIG. 2B is a plan view of the recessed portion 42 shown in FIG. 2A, shown without the accessory panel 50. As seen in FIGS. 2A and 2B, a recessed surface 42*a* of recessed portion 42 is connected to base portion 30*d*-1 of surface 30*d* by a connecting portion 42*b* extending from the recessed surface 42*a* to the base portion 30*d*-1 along a perimeter of the recessed surface 42*a*. Through holes 42*c* are provided in recessed surface 42*a* to enable attachment of an accessory panel to the recessed portion 42. For example, each of holes 42*c* may have a threaded grommet or a grommet for a spring pin or other pin secured therein. The accessory panel (for example, panel 50) may then be secured in recessed portion 42 using threaded fasteners or spring pins applied to holes 42*c* through corresponding coaxial holes (such as holes 53) in the panel 50.

Figure 3:
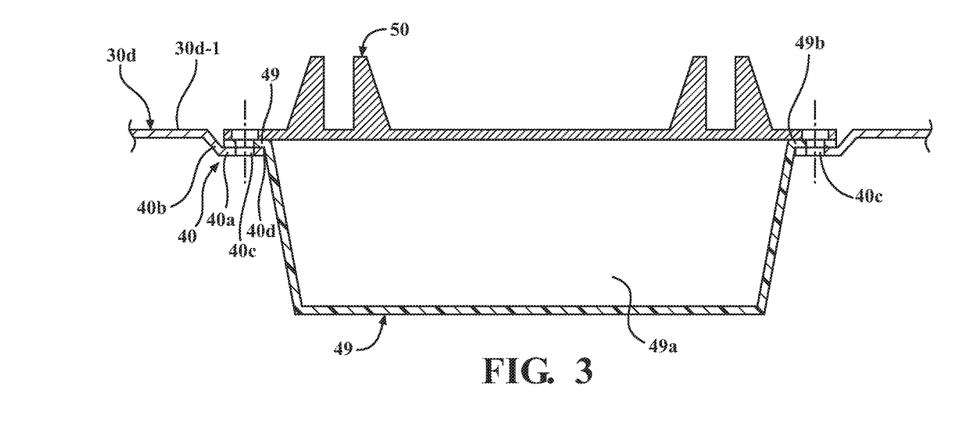
FIG. 3 is a schematic partial cross-sectional side view of a recessed portion formed in a floor of a cargo bed.
Figure 3A:
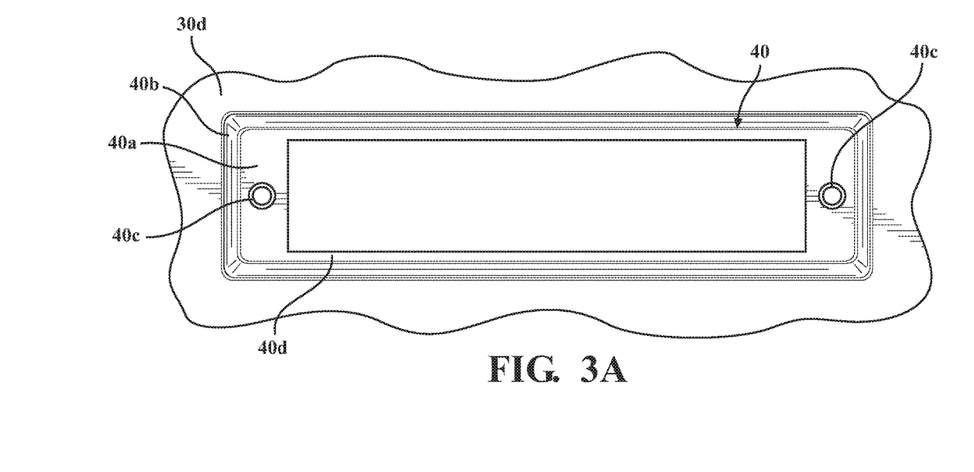
FIG. 3A is a schematic plan view of the recessed portion shown in FIG. 3.

FIG. 3 shows a partial cross-sectional side view of a recessed portion (such as recessed portion 40 of FIG. 1) in the surface forming floor 30*d* of the cargo bed. FIG. 3 shows the recessed portion 40 with an embodiment 49 of a detachable accessory panel mounted therein. FIG. 3A is a plan view of the recessed portion 40 shown in FIG. 3, shown without the accessory panel 49. As seen in FIGS. 3 and 3A, a recessed surface 40*a* of recessed portion 40 is connected to base portion 30*d*-1 of surface 30*d* by a connecting portion 40*b* extending from the recessed surface 40*a* to the base portion 30*d*-1 along a perimeter of the recessed surface 40*a*. Through holes 40*c* are provided in recessed surface 40*a* to enable attachment of panel 49 to the recessed portion 40. For example, each of holes 40*c* may have a threaded grommet or a grommet for a spring pin or other pin secured therein. The panel 49 may then be secured in recessed portion 40 using threaded fasteners or spring pins applied to holes 40*c* through corresponding coaxial holes in the panel 49. Provision of a through hole in a recessed portion enables an accessory panel (such as accessory panel 49) incorporating a storage receptacle or compartment to be attached to the recessed portion.

Figures 6, 7:
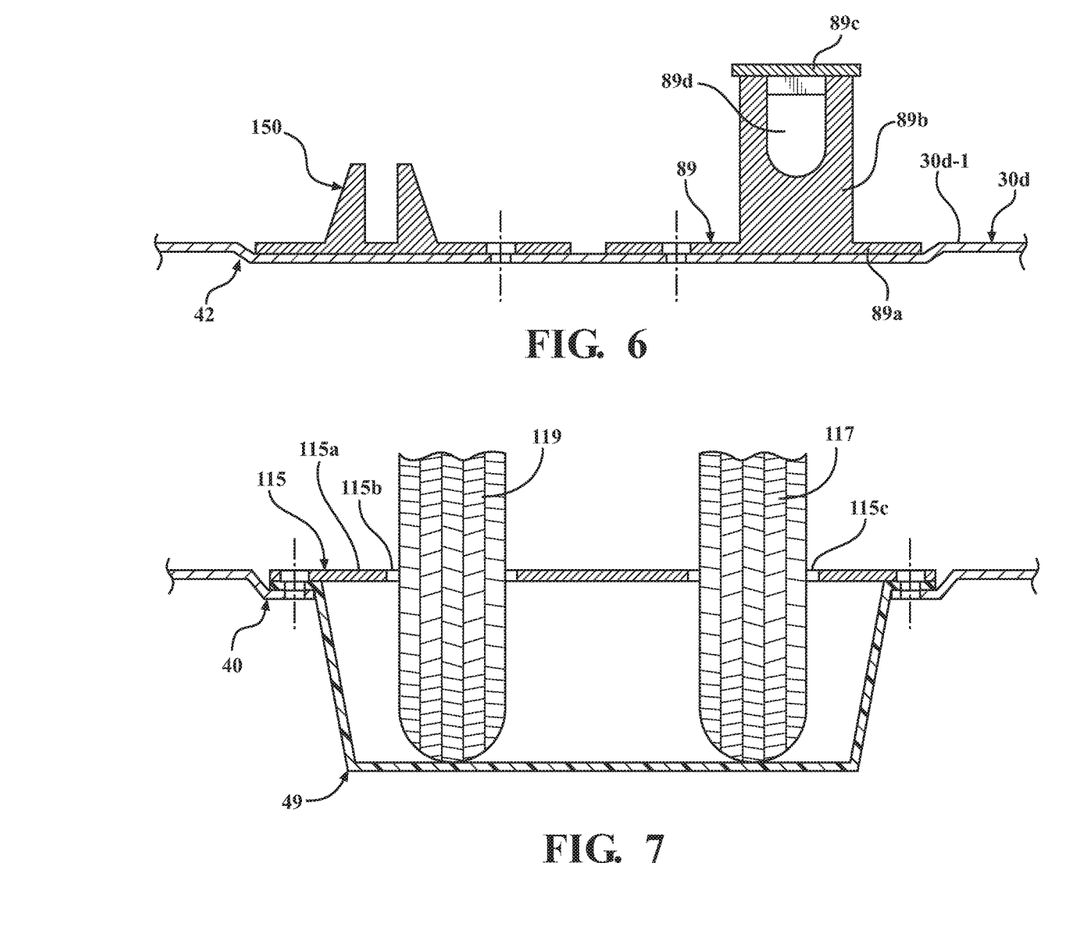
FIG. 6 shows an embodiment of a cargo bed surface, in which a recessed portion may be structured to enable mounting of multiple accessory panels therein.
FIG. 7 shows an embodiment in which a storage receptacle panel is mounted in a recessed portion of a cargo bed surface containing a through hole.

The panel 49 shown in FIG. 3 includes an an attachment portion 49*b* structured to be attachable to a recessed surface (such as recessed surface 40*a*) and a storage receptacle 49*a* extending from the attachment portion into and through the opening 40*d*. This panel configuration enables a portion of a space between the cargo bed and another portion of the vehicle surrounding the cargo bed to be used for storing cargo and/or other items. For example, a through hole may be incorporated into a recessed surface of the recessed portion 36 of FIG. 1, thereby enabling a space between the surface 30*c* and an outer or exterior wall of the truck body to be used to store items. The storage receptacle 49*a* may support an object positioned within the receptacle. In another example, securement of an accessory panel such as panel 115 and/or a storage receptacle panel 49 in a recessed surface including a through hole as shown in FIG. 7 may enable objects or portions of objects to be positioned in spaces between the floor of the cargo bed and the transmission differential or other portions of the vehicle outside the space defined by the cargo bed surfaces 30*a*-30*e*. Thus, the customizable cargo bed system may enable the constructive use of vehicle spaces which would otherwise go unused, and which would otherwise be unusable.

Referring to FIG. 3, in one or more arrangements, an additional panel (such as a panel 50 as shown in FIG. 2A) may be secured in the recessed portion so as to cover the panel 49. In this configuration, panel 50 may form a cover which closes or seals the opening of the storage receptacle 49*a*. In addition, the panel 50 may include one or more cargo-receiving portions (such as cavity 52*c* shown in FIG. 2A) structured to receive at least a portion of an object therein, and to perform a function separate from panel 49, such as supporting one or more bicycle wheels when the wheel are positioned within the cargo receiving portion of the panel 50, as described herein. This enables multiple panels secured in a single recessed portion of the cargo bed to perform multiple associated functions. Alternatively, the receptacle opening may be closed with a separately formed cover (not shown) having an outer surface configured to be flush with the base portion 30*d*-1 when the cover is secured in the recessed portion. Alternatively, a cover (not shown) may be integrally formed with the remainder of the panel 49 (using a living hinge, for example) and used to close the receptacle opening.

In FIG. 1, the surfaces 30*a*-30*e* of cargo bed 30 include recessed portions 32 and 34 formed in surface 30*a*, recessed portion 38 formed in surface 30*b*, recessed portion 36 formed in surface 30*c*, recessed portions 40, 41, and 42 formed in surface 30*d*, and recessed portion 44 formed in surface 30*e*. For example, recessed portion 34 may be positioned along the surface 30*a* forming the cargo bed front wall, directly below another recessed portion 32 along the surface 30*a* forming the front wall. Also, a recessed portion (such as recessed portion 38) may be positioned along a surface 30*b* forming a second sidewall of the cargo bed 30 directly opposite a recessed portion 36 positioned along a surface 30*c* forming a first sidewall.

In addition, the recessed portion 44 positioned is along an interior surface 30*e* of a tailgate 19 of the cargo bed. The tailgate recessed portion 44 may be positioned so as to be directly opposite the at least one of recessed portion 32 and 34 located along the surface 30a forming the cargo bed front wall when the tailgate 19 is fully raised. Positioning of the recessed portions on opposed walls directly opposite each other may enable accessory panels as described herein to be positioned directly opposite each other if needed, for supporting cargo which may extend across a width or length of the cargo bed.

In addition, as seen in FIG. 1, at least one recessed portion 40 may be positioned along a surface 30d forming a floor of the cargo bed 30 and in a front portion of the cargo bed. Also, at least one recessed portion 42 may be positioned along the surface 30d forming the floor of the cargo bed 30 and in a rear portion of the cargo bed. Any of a variety of other arrangements of recessed portions are also possible.

Each recessed portion may be structured to enable mounting of a detachable, accessory panel therein. Embodiments of a detachable accessory panel may be removably attachable to any one of multiple surfaces of the adjoining surfaces 30a-30e for supporting at least a portion of a cargo object along any one of the multiple surfaces. An accessory panel is an accessory panel which may be removably attached to a recessed portion of more than one of the adjoining surfaces 30a-30e (including the tailgate wall interior surface 30e) defining the cargo bed, and which may be structured to perform the same function no matter which surface the panel is attached to. The accessory panel may be detachable from (or removably securable to) a surface of the cargo bed 30 using, for example, mechanical fasteners or any other suitable method which may allow the panel to be easily positioned, attached to, and removed from a desired recessed portion in a desired one of surfaces 30a-30e.

Embodiments of the panels described herein may also have different lengths, according to the requirements of a particular application. Embodiments of the accessory panels described herein may have an attachment portion structured to be attachable to a surface of the cargo bed. The panel embodiments may also include one or more cargo receiving portions extending from or otherwise coupled to the attachment portion, and structured for receiving and/or and supporting therein at least a portion of a cargo object therein. Embodiments of the accessory panels described herein may have attachment features (for example, through holes) enabling attachment of the panels to the cargo bed surfaces 30a-30e.

For example, FIG. 2A shows a cross-sectional side view of one embodiment 50 of a detachable accessory panel securable in any of one or more of the recessed portions 32-44. In the particular example shown, the panel 50 is shown mounted in a recessed portion 42 formed in a surface 30d which forms a floor of the cargo bed 30. However, the panel 50 may be configured to be mountable in any recessed portion incorporated into the cargo bed. Accessory panel 50 may have an attachment portion 51 structured to be attachable to a surface of the cargo bed (such as recessed surface 42a). The attachment portion 51 may include through holes 53 formed therein to enable insertion of attachment mechanisms (such as threaded fasteners) therein, to secure the panel to a surface of the cargo bed, as previously described. For example, the holes 53 may be positioned for alignment with similar holes 42c formed in recessed portion 42 as previously described.

In one or more arrangements, a detachable accessory panel may be structured so that an outer surface of the attachment portion is coplanar or substantially coplanar with the base portion of the cargo bed surface in which the recessed portion is formed. For example, in the embodiment shown in FIG. 2A, an outer surface of attachment portion 51 is structured to be coplanar or substantially coplanar with base portion 30d-1, along a plane AA.

Any detachable accessory panel may also include one or more cargo receiving portions extending from or otherwise coupled to the attachment portion, and structured for receiving at least a portion of a cargo object therein. The cargo receiving portion(s) of the panel may be structured to support at least a portion of an object positioned in the cargo bed when the panel is attached to a surface of the cargo bed and the portion of the object is positioned within the cargo receiving portion. For example, in the embodiment shown in FIG. 2A, accessory panel 50 has a first pair of opposed walls 52a and 52b extending from the attachment portion 51, and a cavity 52c formed between the walls 52a and 52b. Accessory panel 50 may also have a second pair of opposed walls 54a and 54b extending from the attachment portion 51, and a cavity 54c formed between the walls 54a and 54b.

Each of cavities 52c and 54c forms a cargo receiving portion structured for receiving at least a portion of a cargo object therein. As seen in FIGS. 1, 2, and 2A, the panel embodiment 50 may be structured to support a pair of bicycles supported side-by-side within the cargo bed and aligned in a direction parallel to a fore-aft axis of the vehicle. As shown in FIG. 2, two detachable accessory panels 50-1 and 50-2 having the design shown in FIG. 2A may be secured in recessed portion 32 of the surface forming front wall 30a, and in recessed portion 42 in the surface forming floor 30d. As seen in FIG. 2, cavities 52c-1 and 52c-2 may be structured to receive therein front and rear wheels of a bicycle 39, which will then be supported in the cargo bed 30 by associated walls of the panels 50-1 and 50-2. In addition, it is seen that each of panels 50-1 and 50-2 may be positioned and secured along any of multiple ones of recessed portions 32-44, and will be capable of performing the same function in any of the recessed portions.

FIG. 4 shows another embodiment 60 of a panel which may be attached to a recessed portion of the cargo bed. For purposes of description, panel 60 is shown attached to recessed portion 40 as shown in FIG. 3A which has a through hole 40d formed therein as previously described. Panel 60 includes an attachment portion 60a, a channel-receiving cavity 60c formed in the attachment portion, and a channel 60b (such as a C-channel) attached to the panel within the cavity 60c so as to face toward an interior of the cargo bed 30 when the panel 60 is mounted in a recessed portion of a surface forming the cargo bed. Channel 60b may extend along at least a portion of the panel to define a cargo receiving portion. The channel 60b may include lips 60m extending from ends of the channel flanges to partially overlap the channel web 60w, to help secure a cargo object to the channel.

The channel 60b may be configured to receive and secure therein a projection extending from a cargo object. The projection may be designed to slide along and within the channel 60b, and may be inserted into the channel from an open end of the channel. In the example of FIG. 4, a projection 61f extends from a side of a storage container 61. Container 61 may include an enclosure 61s having an opening which may be covered or sealed by a hinged door 61d rotatably coupled to the enclosure. Projection 61f may be slid into channel 60b to mount the storage container 61 to a surface forming a wall or floor of the cargo bed.

FIG. 4 shows the storage container 61 mounted to a floor 30d of the cargo bed. However, the panel 60 incorporating the channel 60b and the storage container 61 may also be secured to any recessed portion (for example, recessed portion 36 of the surface forming sidewall 30c). In addition, although the panel 60 is shown in FIG. 4 as mounted to a recessed portion including a through hole, the various dimensions of the panel 60 and/or channel 60b may be specified so that the panel 60 may be mounted in a recessed portion that does not contain a through hole. The channel structure may permit a wide variety of accessories or attachments to be mounted to a panel, by forming or mounting a projection on the accessory which is suitable for slidable coupling with the channel.

Figure 5:
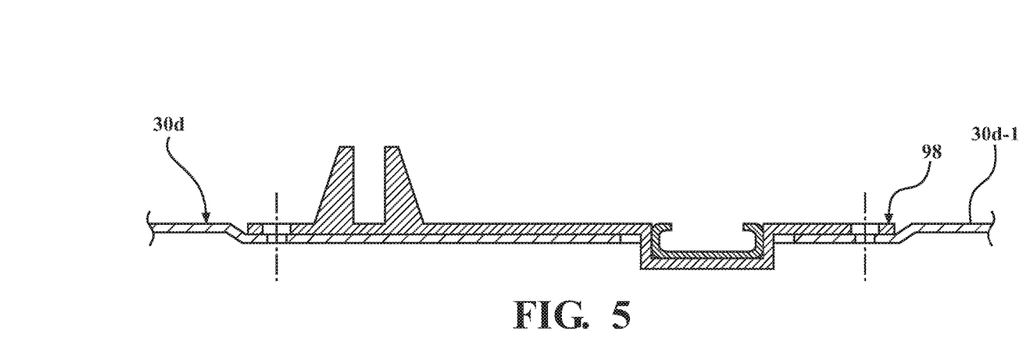
FIG. 5 shows an embodiment of an accessory panel structured to perform multiple functions.

FIG. 5 shows another embodiment in which a single accessory panel is structured to perform multiple functions. In the example shown, a single panel 98 incorporates a wheel support structure as shown in FIG. 3A and a channel structure as shown in FIG. 4.

Figures 8, 8A:
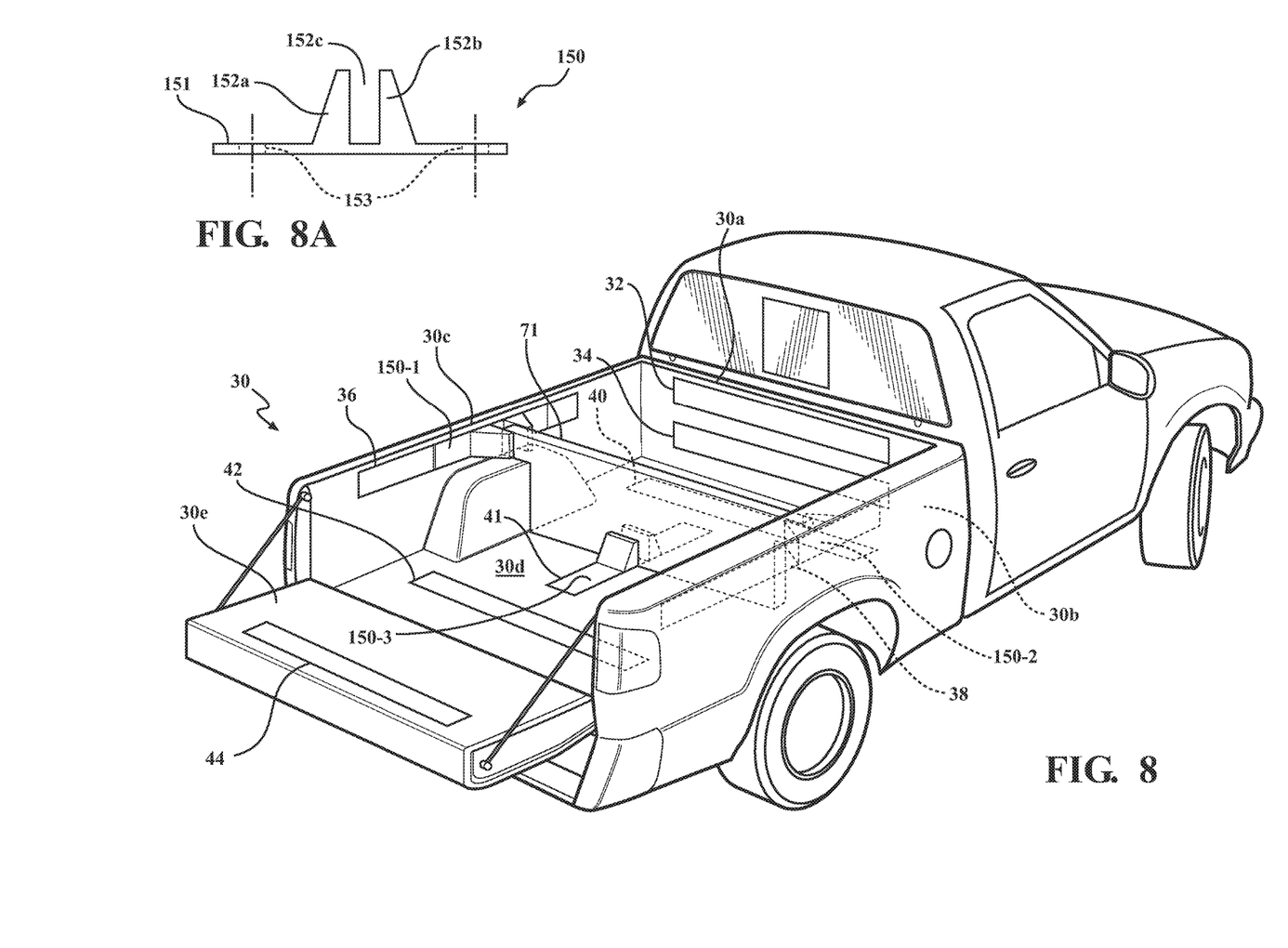
FIG. 8 is a schematic perspective view of a cargo bed in which two detachable accessory panels having the same design secured in recessed portions of associated cargo bed surfaces, to support a cargo bed divider positioned in the cargo bed.
FIG. 8A is a schematic side view of the detachable accessory panel shown in FIG. 8.

FIG. 6 shows an additional embodiment, in which the recessed portion may be structured to enable mounting of multiple accessory panels therein. In the example shown, a first panel 150 as shown in FIG. 8A may be mounted in recessed portion 42 previously described, while an additional panel 89 may be mounted in recessed portion 42 adjacent the first panel 150. The second panel may be designed to perform a function different from that performed by the panel 150. For example, panel 89 may include an attachment portion 89a as previously described, and a base 89b extending from the attachment portion toward an interior of the cargo bed. The base 89b may define a cavity 89d forming a cargo-receiving portion, which may be structured to receive portions of items such as canoe oars or fishing poles. A cover portion 89c may be hinged to the base 89b for covering and closing an opening to the cavity 89d.

FIG. 7 shows another embodiment in which a storage receptacle panel 49 as described herein is mounted in a recessed portion (for example, recessed portion 40) containing a through hole 40d. A cover panel 115 may be mounted in the recessed portion 40 so as to cover an opening in the storage receptacle 49a. Panel 115 may include an attachment portion 115a and cargo receiving portions in the form of a pair of through openings or holes 115b and 115c formed in the attachment portion. Holes 115b and 115c may be structured to permit the insertion of portions of cargo objects therethrough, so that the portions of the objects extend into the storage receptacle. In the example shown in FIG. 7, bicycle tires 117 and 119 of two adjacent bicycles are inserted into holes 115b and 115c. The tires may extend into the storage receptacle 49a and may rest against a floor of the storage receptacle 49a as shown, or may rest against side edges of the holes 115b and 115c. The tires may also be supported in upright positions along their sides by side edges of the holes 115b and 115c. This may provide an alternative way to support portions of cargo objects positioned and supported in the cargo bed.

In an alternative embodiment, the panel 49 forming the storage receptacle 49a may be omitted, and the cover panel 115 may be attached directly to a recessed portion of a cargo bed surface containing a through hole as shown in FIG. 3A. The bicycle tires or portions of other object(s) may then be inserted in the openings 115b and 115c, with the inserted portions of the object(s) being supported by edges of the holes 115b and 115c. Thus, the portions of the objects inserted into the holes 115b and 115c may reside between a recessed portion of a cargo bed surface and another portion of the vehicle (for example, the vehicle transmission or an outer wall of the vehicle body).

Referring to FIGS. 8 and 8A, in another arrangement, a panel 150 may incorporate one or more cavities structured to receive therein a dividing member structured to partition the cargo bed 30. Panel 150 may be structured in a manner similar to panel 50 previously described, and may include an attachment portion 151 structured to be attachable to a surface of the cargo bed in a recessed portion. The attachment portion 151 may include through holes 153 formed therein to enable insertion of attachment mechanisms (such as threaded fasteners) therein, to secure the panel to the surface of the cargo bed. The holes 153 may be positioned for alignment with similar holes (not shown) formed in a recessed surface as previously described. Panel 150 also has a pair of opposed walls 152a and 152b extending from the attachment portion 151, and a cargo-receiving portion in the form of a cavity 152c formed between the walls 152a and 152b. Cavity 152c may be structured to receive a portion of a cargo bed dividing member therein, for supporting the portion of the dividing member in the cargo bed as shown in FIG. 8.

As shown in FIG. 8, two detachable accessory panels 150-1 and 150-2 having the design shown in FIG. 8A may be secured in recessed portion 36 of the surface forming sidewall 30c, and in recessed portion 38 of the surface forming sidewall 30b. Another detachable accessory panel 150-3 having the design shown in FIG. 10A may be secured in recessed portion 41 of the surface forming floor 30d. Panels 150-1, 150-2, and 150-3 may combine to support the dividing member 71 in the cargo bed as shown. In addition, it is seen that any of the panels 150-1, 150-2, and 150-3 may be positioned and secured along any of the recessed portions 32-44, and any of these panels may be positionally switched with any other one of the panels 150-1, 150-2, and 150-3 to perform the same function.

Although the accessory panels and recessed portions shown in the drawings have various locations and sizes relative to other portions of the vehicle, the characteristics of the panels and recessed portions shown are in the nature of examples provided to illustrate the operating principles of the elements described herein, and to illustrate some possible structures and arrangements of the elements. Thus, the locations, sizes, and structures of the panels and recessed portions described herein are not meant to be restrictive, and panels and recessed portions have any of a variety of alternative structures, sizes, and locations within the cargo bed.

An embodiment of the cargo bed 30 and one or more accessory panels as described herein may combine to form a customizable cargo bed system for a vehicle. The cargo bed system may include a plurality of adjoining surfaces, with at least one surface of the plurality of adjoining surfaces including at least one recessed portion as described herein. The system may also include at least one accessory panel structured to be removably attachable along a recessed portion of a surface including a recessed portion. The accessory panel may be structured to support at least a portion of an object to be positioned in the cargo bed when the accessory panel is attached to a surface along a recessed portion of the surface. The cargo bed surfaces may include a plurality of recessed portions, and the accessory panel may be removably attachable to any one of multiple recessed portions of the plurality of recessed portions.

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A cargo bed for a vehicle, the cargo bed comprising a plurality of adjoining surfaces, at least one surface of the plurality of adjoining surfaces having at least one recessed portion formed therealong, the at least one recessed portion being structured to enable mounting of at least one detachable accessory panel therein, wherein at least one surface of the plurality of adjoining surfaces has an opening formed therein along the at least one recessed portion, the opening being configured to enable a portion of the at least one detachable accessory panel to extend from the cargo bed through the opening and into a space between the cargo bed and another portion of the vehicle adjacent the cargo bed, wherein the at least one recessed portion is structured to enable mounting of another detachable accessory panel therein, and wherein the other detachable accessory panel is structured to cover at least a portion of the at least one detachable accessory panel when the other detachable accessory panel is mounted in the at least one recessed portion.

2. The cargo bed of claim 1 further comprising a bed liner for a cargo bed, and wherein the bedliner includes a through hole structured to be aligned with the opening formed along the at least one recessed portion.

3. A cargo bed for a vehicle, the cargo bed comprising a plurality of adjoining surfaces, at least one surface of the plurality of adjoining surfaces having at least one recessed portion formed therealong, the at least one recessed portion being structured to enable mounting of at least one detachable accessory panel therein, wherein at least one surface of the plurality of adjoining surfaces has an opening formed therein along the at least one recessed portion, the opening being configured to enable a portion of the at least one detachable accessory panel to extend from the cargo bed through the opening and into a space between the cargo bed and another portion of the vehicle adjacent the cargo bed, wherein the at least one recessed portion is positioned along a surface forming a front wall of the cargo bed.

4. The cargo bed of claim 3 further comprising a tailgate recessed portion positioned along an interior surface of a wall forming a tailgate of the cargo bed, the tailgate recessed portion being positioned so as to reside directly opposite the at least one recessed portion along the surface forming the front wall, when the tailgate is fully raised.

5. The cargo bed of claim 3 further comprising another recessed portion positioned along the surface forming the front wall and directly below the at least one recessed portion along the surface forming the front wall.

6. A cargo bed for a vehicle, the cargo bed comprising a plurality of adjoining surfaces, at least one surface of the plurality of adjoining surfaces having at least one recessed portion formed therealong, the at least one recessed portion being structured to enable mounting of at least one detachable accessory panel therein, wherein at least one surface of the plurality of adjoining surfaces has an opening formed therein along the at least one recessed portion, the opening being configured to enable a portion of the at least one detachable accessory panel to extend from the cargo bed through the opening and into a space between the cargo bed and another portion of the vehicle adjacent the cargo bed, wherein the at least one recessed portion is positioned along a surface forming a first sidewall of the cargo bed.

7. The cargo bed of claim 6 further comprising another recessed portion positioned along a surface forming a second sidewall of the cargo bed and directly opposite the at least one recessed portion positioned along the surface forming the first sidewall.

8. A detachable accessory panel for a vehicle cargo bed, the accessory panel including a portion configured to extend through an opening formed in a surface forming a portion of the cargo bed when the accessory panel is mounted in the cargo bed, so as to extend into a space between the cargo bed and another portion of the vehicle adjacent the cargo bed, wherein the portion of the accessory panel configured to extend through an opening formed in a surface forming a portion of the cargo bed defines a channel extending along at least a portion of the panel, and wherein the channel has a C-channel mounted therein, the C-channel being structured to receive a portion of a first cargo object therein when the accessory panel is mounted in the cargo bed.

9. The detachable accessory panel of claim 8 wherein the detachable accessory panel further includes a cavity structured to receive a portion of a second cargo object therein when the accessory panel is mounted in the cargo bed, the second cargo object being different from the first cargo object.

10. The detachable accessory panel of claim 8 wherein the detachable accessory panel includes a cargo receiving portion structured to receive therein a dividing member structured to partition the cargo bed.

11. A customizable cargo bed system for a vehicle, the cargo bed system comprising:

a cargo bed including a plurality of adjoining surfaces, at least one surface of the plurality of adjoining surfaces including at least one recessed portion, the at least one recessed portion including an opening formed therein, the opening being configured to enable a portion of a cargo object positioned in the cargo bed to extend from the cargo bed through the opening and into a space between the cargo bed and another portion of the vehicle adjacent the cargo bed; and at least one accessory panel structured to be removably attachable to the at least one surface along the at least one recessed portion, wherein the plurality of adjoining surfaces include an associated plurality of recessed portions, and wherein the at least one accessory panel is removably attachable to any one of multiple recessed portions of the plurality of recessed portions.

12. A customizable cargo bed system for a vehicle, the cargo bed system comprising:

a cargo bed including a plurality of adjoining surfaces, at least one surface of the plurality of adjoining surfaces including at least one recessed portion, the at least one recessed portion including an opening formed therein, the opening being configured to enable a portion of a cargo object positioned in the cargo bed to extend from the cargo bed through the opening and into a space between the cargo bed and another portion of the vehicle adjacent the cargo bed; and at least one accessory panel structured to be removably attachable to the at least one surface along the at least one recessed portion, wherein the at least one accessory panel is structured to be received in the at least one recessed portion such that a surface of the at least one accessory panel is coplanar or substantially coplanar with a surface in which the at least one recessed portion is formed.

13. A cargo bed for a vehicle, the cargo bed comprising a plurality of adjoining surfaces, at least one surface of the plurality of adjoining surfaces having at least one recessed portion formed therealong, the at least one recessed portion being structured to enable mounting of at least one detachable accessory panel therein, wherein at least one surface of the plurality of adjoining surfaces has an opening formed therein along the at least one recessed portion, the opening being configured to enable a portion of the at least one detachable accessory panel to extend from the cargo bed through the opening and into a space between the cargo bed and another portion of the vehicle adjacent the cargo bed, wherein the at least one recessed portion is structured to enable mounting of another detachable accessory panel therein, and wherein the other detachable accessory panel is structured to cover at least a portion of an opening of the receptacle when the other detachable accessory panel is mounted in the at least one recessed portion.

14. The cargo bed of claim 13 wherein the other detachable accessory panel includes a first cavity structured to receive therein a portion of a first cargo object, and a second cavity structured to receive therein a portion of a second cargo object different from the first cargo object.

15. The cargo bed of claim 13 wherein the other detachable accessory panel includes at least one portion structured to support a portion of a cargo object extending from the cargo bed through the opening and into the space between the cargo bed and the other portion of the vehicle adjacent the cargo bed.

16. A detachable accessory panel for a vehicle cargo bed, the accessory panel including a portion configured to extend through an opening formed in a surface forming a portion of the cargo bed when the accessory panel is mounted in the cargo bed, so as to extend into a space between the cargo bed and another portion of the vehicle adjacent the cargo bed, wherein the at least one detachable accessory panel defines a receptacle configured to extend through the opening and into the space between the cargo bed and the other portion of the vehicle, wherein the surface forming the portion of the cargo bed is a recessed portion structured to enable the at least one detachable accessory panel to be mounted therein, wherein the recessed portion is structured to enable mounting of another detachable accessory panel therein, and wherein the other detachable accessory panel is structured to cover at least a portion of an opening of the receptacle when the other detachable accessory panel is mounted in the recessed portion.

\* \* \* \* \*